United States Patent Office 3,471,410
Patented Oct. 7, 1969

3,471,410
INCORPORATION OF ZIRCONIA INTO FLUID CATALYSTS TO REDUCE COKE FORMATION
Stephen M. Oleck, Moorestown, and William A. Stover, Woodbury, N.J., assignors to Mobil Oil Corporation, a corporation of New York
No Drawing. Filed Apr. 28, 1967, Ser. No. 634,469
Int. Cl. B01j *11/40;* C10g *11/04, 11/18*
U.S. Cl. 252—454      13 Claims

ABSTRACT OF THE DISCLOSURE

A method of reducing coke formation and improving the selectivity and efficiency of a fluid catalyst. Involves incorporating, in a silica-alumina gel matrix, the matrix having been prepared by precipitating the alumina on silica gel, a source of Group IV–B metal oxide, preferably of zirconia, such that the matrix contains, on a dry basis, the Group IV–B metal oxide in an amount equal to at least 0.1% by weight of the matrix, and thereafter dispersing therein finely divided crystalline alumino-silicate zeolite particles. The resulting product is then dried, as by spray drying, in the form of particles of a size suitable for use as a fluidized catalyst. The resulting fluid catalyst is used for the catalytic conversion of organics such as hydrocarbons.

---

Cross-references to related applications

A related application filed by one of us, William A. Stover, on Mar. 19, 1965, entitled "Cracking Catalysts and Method of Preparing the Same," Ser. No. 441,356, and now abandoned describes in detail a method for preparing fluid catalysts. Such method is generally applicable, with certain exceptions discussed hereinafter, to the present invention. The contents of said application are incorporated herein by reference.

BACKGROUND OF THE INVENTION

Field of the invention

The invention relates to the preparation of fluid catalysts for use in hydrocarbon processing. Thus, such catalysts may be utilized in the catalytic conversion of organic materials, particularly for such conversions as catalytic cracking, hydrocracking, isomerization, alkylation, reforming, and the like.

Description of the prior art

A particularly suitable method of preparing fluid catalysts is described in the previously referred to Stover application (Ser. No. 441,356, filed Mar. 19, 1965). The method described in this application comprises precipitating alumina gel on silica gel at an acidic pH to thereby form a silica-alumina gel matrix, thereafter depositing in such gel matrix very fine particles of an aluminosilicate zeolite carrying rare earth metal cations (generally referred to as rare earth zeolite), then drying the resulting product in the form of particles of a size suitable for use as a fluidized catalyst, as by spray drying. The resulting fluid catalyst is desirable in that it shows a high activity and selectivity in hydrocarbon conversion reactions.

It has been found, however, that such fluid catalysts, during the initial cracking cycle, tend to produce a relatively high yield of coke. This is, of course, undesirable in that it is generally at the expense of the yields of more desirable constituents such as gasoline and $C_4$'s. Additionally, when such fresh fluid catalyst is added as makeup to a fluid catalytic cracking unit, regeneration of such fresh catalyst resulting in high coke levels is believed to contribute to the high temperature deactivation that frequently occurs in such fluid catalytic cracking units. Accordingly, it would be highly desirable to minimize the thermal deactivation of fresh catalyst, as by providing a method of preparing a fluid catalyst which is characterized by relatively low yields of coking during its initial cracking cycle.

SUMMARY OF THE INVENTION

The method of the present invention involves preparing a composite fluid catalyst by forming a silica-alumina gel matrix, the matrix having been formed by precipitating the metal oxide on silica gel and then, prior to the dispersing of particles of a crystalline aluminosilicate zeolite in the foregoing matrix, incorporating into such matrix a source of Group IV–B metal oxide, preferably of zirconia, such that the matrix contains the Group IV–B metal oxide in an amount equal to at least 0.1% by weight of the matrix on a dry basis. Thereafter, particulate crystalline aluminosilicate zeolite is dispersed in the so treated matrix, the amount of crystalline zeolite so dispersed being at least 1% by weight of the finished composition on a dry basis. The resulting product is then dried in the form of particles of a size suitable for use as a fluidized catalyst, as by spray drying.

We have found that the dispersing of such Group IV–B metal oxide in the silica-alumina gel matrix prior to the subsequent incorporation of crystalline aluminosilicate zeolite therein results in a fluid catalyst characterized by lower coke forming tendencies than a fluid catalyst made in a similar manner, but wherein no Group IV–B metal oxide is dispersed in the silica-alumina matrix. Moreover, the fluid catalysts made by the method of our invention tend to exhibit superior selectivity and efficiency than are exhibited by corresponding "control" fluid catalysts.

DESCRIPTION OF SPECIFIC EMBODIMENTS

The acidic silica-alumina matrix into which the source of Group IV–B metal oxide, e.g., of zirconia, is incorporated (followed by incorporation of particulate crystaline aluminosilicate zeolite) is advantageously prepared by precipitating the silica from an alkaline aqueous solution, as by means of a mineral acid, preferably using a limited amount of acid so as to reduce the pH but still leave the mixture mildly alkaline, then adding an aqueous solution of an aluminum salt in which the aluminum exists in the anion (e.g. sodium or calcium aluminate) to the resulting slurry, and then adding an aqueous solution of an aluminum salt in which the aluminum is present in the cation (e.g. aluminum sulfate or chloride), thus lowering the pH to about 4–6 and preferably to about 4–5, and impregnating the silica gel with alumina precipitated from both of the added aluminum salts. These reactions may be carried out in the presence of sequestering agent such as aldonic acid or aldonate.

Suitable methods for making such a matrix are described in Ashley U.S. Patent 2,701,793, Winyall U.S. Patent 2,886,512, Secor et al. U.S. Patent 2,935,463, and a particularly suitable method in Braithwaite U.S. Patent 2,941,961.

For best results the alumina content of the matrix (on a dry basis) should not exceed about 25% and preferably should not exceed about 13%. Superior results are obtained by appreciably reducing the alumina content of the matrix, e.g. to below 10% and preferably to a value within the range of about 1 to 7%.

In accordance with one aspect of our invention, there is incorporated in such silica-alumina matrix at least about 0.1% by weight of said matrix on a dry basis, a Group IV–B metal oxide, that is, an oxide of either zirconium, titanium, or hafnium, particular preference being accorded to zirconia. The amount of Group IV–B metal oxide is generally from about 0.1 to 10 percent by weight of the matrix, and preferably is from about 0.5 to 5 weight percent. Most preferably, the range is from about 1 to 3 weight percent.

The Group IV–B metal oxide is advantageously incorporated in the matrix by admixing with a slurry of freshly precipitated silica-alumina matrix a solution, e.g., an aqueous solution, of a water soluble salt of the Group IV–B metal. The matrix slurry and the Group IV–B metal salt solution are thoroughly admixed to thereby precipitate the Group IV–B metal oxide into the matrix.

The concentration of the Group IV–B metal salt solution may vary within wide limits, e.g., from about 1% by weight up to saturation, a more preferred range being from about 10% to about 40% by weight. Any Group IV–B metal salt that is water soluble may be employed including, e.g., Group IV–B metal sulfates, nitrates, chlorides, oxychlorides, and the like.

The proportions as between the matrix slurry and the Group IV–B metal salt solution may be varied as desired, depending upon the desired level of Group IV–B metal oxide in the silica-alumina matrix.

The temperature at which the matrix slurry and Group IV–B metal salt solution are admixed is not critical. Generally it will be from about room temperature to 140° F.

While it is generally most convenient to utilize an aqueous solution of the Group IV–B metal salt for admixture with the matrix slurry, it will of course be understood that the Group IV–B metal oxide may be incorporated by other means, e.g., as by employing an organic solution of a Group IV–B metal salt as the source of Group IV–B metal oxide, etc.

Where the Group IV–B metal salt is rather highly acidic in nature, e.g., zirconium sulfate, and where such solution is employed in high concentration and/or quantity so as to obtain a relatively high level of Group IV–B metal oxide in the silica-alumina matrix, then in order to maintain the pH of the matrix at a pH range of from about 4 to 6, the pH may be adjusted to such range by the addition of an appropriate alkaline material such as, e.g., ammonium hydroxide, ammonium carbonate, or the like.

The precise explanation as to why the catalysts of the present invention, which contain a Group IV–B metal oxide dispersed in the matrix phase, exhibit low coke forming tendencies as compared to similar catalysts which do not contain such Group IV–B metal oxide dispersed in the matrix phase, is not known. Without wishing to be bound by any particular theory, it would appear that inasmuch as the matrix is formed by initially precipitating silica and thereafter precipitating alumina thereon, the matrix particles comprise silica in their interior, which silica is surface coated with alumina. Such surface alumina is believed to contribute significantly to relatively high coke formation. It appears that by the method of the present invention, wherein a Group IV–B metal oxide such as zirconia is subsequently precipitated onto the foregoing matrix, such Group IV–B metal oxide tends to surface coat the alumina, in whole or in part, thereby reducing the coke forming tendency of the resulting catalyst.

The matrix (containing Group IV–B metal oxide dispersed therein) is advantageously prepared in such a manner that, as charged to the cracking unit, it has a pore volume in the range of from about 0.5 to 1.2 cc./g., and preferably from about 0.7–1.00 cc./g. The average pore diameter should desirably be in excess of about 40 angstroms and should not exceed about 250 angstroms, and preferably should be from about 80 to 200 angstroms. (A detailed discussion of how average pore diameter is determined is given in the text edited by P. H. Emmett and entitled "Catalysts, vol. I," at page 56, 1954 ed., Reinhold Publishing Corp., New York. See also Eastwood et al. U.S. Patent 3,161,488.)

Increase in pore size increases the effective diffusivity of the resulting catalyst. Also the increase in pore size gives a material which is a more effective cracking catalyst, particularly with heavy gas oils (e.g. oils having a boiling point range of from about 650 to 1050° F.) and wide cut gas oils having a boiling point range of from about 400 to 1000° F. Catalysts made with the large pore size matrices also have longer effective lives and are more resistant to sintering and resistant to decrease in their effective diffusivity with continued use.

The porosity of the matrix can be adjusted so as to obtain the desired pore volume according to prior art techniques. Thus, increased porosity may be obtained by (1) increasing the time and temperature of ageing of the silica gel or (2) increasing the silica content during the formation of the silica gel, raising the pH during ageing. For a more detailed discussion of such prior art techniques for adjusting porosity, see "Control of Physical Structure of Silica-Alumina Catalyst" by Ashley et al., vol. 44, Industrial and Engineering Chemistry, at pages 2861–2863 (December 1962).

The matrices having larger pores are generally less dense than those in which the pore size is smaller. If desired, the density of the final catalyst can be increased by the addition of high density weighting agents, e.g. finely divided alpha alumina, mullite, zircon ore or the like, in amounts, for example, of from about 10 to 60% based on the weight of the matrix, and more preferably from about 30 to 40%. These heavy fines desirably are added to the sodium silicate forming solution.

The matrix may, of course, also contain other components, such as kaolin type clays in amounts, for example, of from about 10 to 60%, and more preferably from about 30 to 40%, based on the weight of the matrix. Here again, it is preferable that the silica-alumina component have a low alumina content.

Suitable crystalline aluminosilicates which may be dispersed in the foregoing matrix to provide the composite catalysts of our invention are described in U.S. Patent 3,140,249 as well as U.S. Patent 3,140,253, both incorporated herein by reference. Representative crystalline aluminosilicates suitable for the present invention include those natural and synthetic crystalline aluminosilicates having uniform pores of a diameter preferably between about 3 and 15 angstrom units. Such crystalline aluminosilicates include zeolites Y, X, A, L, D, R, S, T, Z, E, F, Q, B, ZK–4, ZK–5 as well as naturally occurring zeolites including chabazite, faujasite, sodalite, mordenite and the like. Crystalline aluminosilicates having pore diameters between about 3 and 5 angstrom units may be suitable for size-selective conversion catalysis, while crystalline aluminosilicates having pore diameters between about 6 and 15 angstrom units are preferred for hydrocarbon conversion such as catalytic cracking and the like. Preferred crystalline aluminosilicates include synthetic faujasite or zeolites X and Y, with particular preference being accorded zeolite Y.

The crystalline aluminosilicate particles employed as a component in the catalyst compositions of the present invention are essentially characterized by a high catalytic activity.

This high catalytic activity may be imparted to the particles by base exchanging alkali metal aluminosilicate particles—either before or after dispersion thereof in the matrix—with a base-exchange solution containing ions selected from the group consisting of cations of elements of Groups I–B–VIII of the Periodic Table, hydrogen, and hydrogen precursors, including mixtures thereof with one another. Hydrogen precursors, such as ammonia and ammonium salts, typically undergo, upon heating, degradation to hydrogen cations in contact with aluminosilicates. Suitable methods of base exchange are described in the aforenoted U.S. Patents 3,140,249 and 3,140,253.

It is particularly pointed out that the crystalline aluminosilicate component, being of high catalytic activity in the final composite, may be relatively less active upon dispersion into the matrix material. Subsequently the crystalline aluminosilicate may be made highly active by base exchange, impregnation or the like, after incorporation into the matrix.

Where an alkali metal aluminosilicate is employed initially, it is essential to base exchange either the aluminosilicate particles before or after compositing with the matrix to reduce the sodium content of the final product to less than about 4% by weight and preferably less than 1% by weight. The sodium content of the final composite is essentially less than 4% by weight. Such compositions provide high catalytic activity when zeolite Y is the crystalline aluminosilicate component. Preferably, however, and particularly when zeolite X is the crystalline aluminosilicate component, the sodium content of the final composite should be less than 1% by weight.

As previously discussed, base exchange may be accomplished by one or more contacts (before and/or after incorporation of the crystalline aluminosilicate into the matrix) with a solution containing ions selected from the group consisting of cations of the elements of Groups I-B-VIII, hydrogen and hydrogen precursors, including mixtures thereof with one another.

It is most preferred that the crystalline aluminosilicate be a rare earth zeolite, that is a crystalline aluminosilicate composition containing rare earth metal cations as a result of treatment with a fluid medium, preferably a liquid medium, containing at least one rare earth metal cation. Rare earth metal salts represent the source of rare earth cation. The product resulting from treatment with a fluid medium is an activated crystalline and/or crystalline-amorphous aluminosilicate in which the structure thereof has been modified primarily to the extent of having the rare earth cations chemisorbed or ionically bonded thereto.

Water is the preferred solvent for the cationic salt, e.g., rare earth metal salt, for reasons of economy and ease of preparation in large scale operations involving continuous or batchwise treamtent. Similarly, for this reason, organic solvents are less preferred but can be employed providing the solvent permits ionization of the rare earth metal salt.

Where rare earth cations are employed, they may be present in the fluid medium in an amount varying within wide limits depending upon the pH of the fluid medium. Where the aluminosilicate material has a molar ratio of silica to alumina greater than about 5.0, the fluid medium may contain a rare earth cation equivalent to a pH value ranging from less than 1.0 up to a pH value of about 12.0. Within these limits, pH values for fluid media containing a rare earth cation range from 3.5 to 10.0 and are preferably between a pH value of 4.5 and 8.5. Where the molar ratio of silica to alumina is greater than about 2.2 and less than about 5.0, the pH value for fluid media containing a rare earth cation ranges from 3.8 to 8.5. Thus, depending upon the silica to alumina ratio, the pH value can vary within rather wide limits.

In carrying out the treatment with the fluid medium, the procedure employed varies depending upon the particular aluminosilicate which is treated. If the aluminosilicate which is treated has alkali metal cations associated therewith, e.g., zeolite X or zeolite Y, then the treatment with the fluid medium or media should desirably be carried out until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations. On the other hand, if the aluminosilicate which is treated with the desired fluid medium is substantially free of alkali metal cations, e.g., a calcium aluminosilicate, then the treatment need not be carried out until such time as the metal is exhausted since the presence of metals other than alkali metals does not seriously limit catalytic properties. Effective treatment with the fluid medium to obtain a modified aluminosilicate having high catalytic activity will vary, of course, with the duration of the treatment and the temperature at which the treament is carried out. Elevated temperaures tend to hasten the speed of treatment whereas the duration thereof varies inversely with the general concentration of ions in the fluid medium. In general, the temperatures employed range from below ambient room temperature of 24° C. up to temperatures below the decomposition temperature of the aluminosilicate.

Following the fluid treatment, the treated aluminosilicate is washed with water, preferably distilled water, until the effluent wash water has a pH value of wash water, i.e., between 5 and 8. The aluminosilicate material is thereafter analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of rare earth metal cations in the form of a molten material, vapor, aqueous or non-aqueous solution may be passed slowly through a fixed bed of aluminosilicate. If desired, hydrothermal treatment or corresponding non-aqueous treatment with polar solvents may be effected by introducing the aluminosilicate and fluid medium into a closed vessel maintained under autogenous pressure. Similarly, treatments involving fusion or vapor phase contact may be employed.

Where a rare earth zeolite is desired, a wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates butyrates, valecates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight.

It is to be understood that other mixtures of rare earths are also applicable, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

Aluminosilicates which are treated with a fluid medium or media in the manner above described include a wide variety of aluminosilicates both natural and synthetic which have an amorphous, crystalline or combination of crystalline and amorphous structure. However, it has been found that superior catalysts are obtained when the starting aluminosilicate has either a crystalline or a combination of crystalline and amorphous structure and possesses at least 0.4 and preferably 0.6 to 1.0 equivalent of metal cations per gram atom of aluminum. The aluminosilicates can be described as a three-dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the aluminosilicates may be represented by the formula:

$$M_{2/n}O:Al_2O_3:wSiO_2:YH_2O$$

wherein M represents at least one cation which balances the electrovalence of the tetrahedra, $n$ represents the valence of the cation, $w$ the moles of $SiO_2$ and $Y$ the moles of $H_2O$. The cation can be any or more of a number of metal ions, depending upon whether the aluminosilicate is synthesized or occurs naturally. Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Aluminosilicates falling within the above formula are well known and include synthesized aluminosilicates, natural aluminosilicates, and certain caustic treated clays. Among the aluminosilicates are included zeolites A, Y, L, D, R, S, T, Z, E, F, Q, B, X, levynite, dachiarite, erionite, faujasite, analcite, paulingite, noselite, phillipsite, brewsterite, flakite, datolite, chabazite, gmelinite, leucite, scapolite, mordenite as well as certain caustic treated clays such as montmorillonite and kaolin families. The preferred aluminosilicates are those having pore diameters of at least about 4 angstroms.

Particularly preferred rare earth zeolites for use in this invention may be made by base exchange of sodium zeolite X with rare earth ions to form rare earth zeolite X (see, e.g., Plank et al. U.S. Patent 3,140,249, Example 26), and by base exchange of sodium zeolite Y with rare earth ions to form rare earth zeolite Y (see, e.g., Plank et al. application Ser. No. 195,945, filed May 18, 1962, entitled "Catalyst and Conversion of Organic Compounds in the Presence Thereof").

Other synthesized crystalline aluminosilicates include those designated as ZK-4 and ZK-5.

Other aluminosilicates which can be used are caustic treated clays.

Of the clay materials, montmorillonite and kaolin families are representative types which include the sub-bentonites, such as bentonite, and the kaolins commonly identified as Dixie, McNamee, Georgia, and Florida clay in which the main mineral constituent is halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

| | |
|---|---|
| $Na_2O$/clay (dry basis) | 1.0–6.6:1 |
| $SiO_2$/clay (dry basis) | 0.01–3.7:1 |
| $H_2O/Na_2O$ (mole ratio) | 35–100:1 |

It is to be understood that mixtures of the various aluminosilicates previously set forth can be employed as well as individual aluminosilicates.

As has been previously pointed out, the rare earth zeolites are aluminosilicates containing rare earth metal cations. In no instance should there be any more than 0.25 equivalent per gram atom of aluminum of alkali metal associated with the aluminosilicate.

Within the above limits it is preferred that there be a minimum amount of alkali metal cations associated therewith since the presence of these metals tends to suppress or limit catalytic properties, the activity of which, as a general rule, decreases with increasing content of alkali metal cations. It is also preferred that the novel compositions have at least 0.4 and more desirably 0.6 to 1.0 equivalent per gram atom of aluminum of positive ions of which at least some are rare earth metal cations. Additionally, in those situations wherein the catalyst composition contains metallic cations other than rare earth metal cations, it is then preferred that they be at least divalent with the cations of divalent metals, such as calcium, magnesium, and manganese being particularly advantageous. Polyvalent metallic ions capable of reduction to lower valence states are also particularly advantageous for dual function catalysts.

A more preferred embodiment utilizes rare earth zeolite compositions which have from 0.5 to 1.0 equivalent per gram atom of aluminum of rare earth metal cations. Thus, in a most desirable embodiment of this invention, rare earth metal cations are substantially the only metallic cations associated with the aluminosilicate.

It appears that the rare earth cations tend to impart stability to the aluminosilicate compositions, thereby rendering them more useful for catalytic purposes, particularly in hydrocarbon conversion processes such as cracking.

The incorporation of the rare earth cations into the zeolite by base-exchange is advantageously effected before the zeolite particles are brought into contact with the matrix.

After the rare earth zeolite is blended with the matrix and dried, the resulting composite is advantageously given a wet treatment to remove the residual alkali-metal ions (which may, for example, be present, at this stage in amount of about 1 to 5%, and more usually from about 1 to 3%, based on the zeolite) by further base exchange with materials capable of providing hydrogen ions.

The efficiency of this subsequent treatment is greatly improved if the rare earth zeolite, in finely divided condition, is pretempered by subjecting it to dehydrating conditions, as by calcination, to lower its residual moisture content to a value within the range of 0.3 to 6%, more preferably within the range of 1.5 to 6%, such pretempering being effected before the rare earth zeolite is brought into contact with the matrix. As a result of this pretempering the rare earth zeolite can be later exchanged to a lower sodium content much more easily, it becomes more resistant to loss of crystallinity on contacts with acidic media and the relative crystallinity of the final product is higher. In addition the rare earth component becomes more fixed in the crystalline aluminosilicate and more resistant to removal on subsequent base exchanges.

Suitable pretempering conditions are, for example, a temperature of about 650° F. in the air for about 60 minutes or a temperature of about 1500° F. in air for about 10 minutes, or a treatment with superheated steam at about 1100–1200° F. at 15 p.s.i.g. for from about 10 to 60 minutes; a preferred treatment is at atmospheric pressure at a temperature of about 1050–1250° F. in steam, air, or a steam-air mixture for from about 10 to 60 minutes. (This pretempering technique is described more fully in U.S. application Ser. No. 459,687, filed May 28, 1965, entitled "Improved Crystalline Zeolites and Method of Preparing Same.")

The mean particle size of the rare earth zeolite incorporated into the matrix is advantageously less than about 40 microns. Preferably the particle size is in the range of about 2 to 20 microns, and most preferably from about 2 to 10. The pore openings of the rare earth zeolite are uniform, generally at least 6 angstrom units in diameter, preferably about 6 to 15 angstrom units in diameter.

The fine particles of crystalline aluminosilicate zeolite, e.g., rare earth zeolite, are conveniently slurried in a liquid medium, preferably an aqueous liquid, before adding them to the matrix. Particularly good results are obtained when the liquid medium contains a dissolved rare earth salt such as a rare earth chloride, bromide, iodide, sulfate, nitrate or the like, with preference being accorded rare earth chlorides.

The presence of the dissolved rare earth salt increases the resistance to loss of activity at the low pH of the matrix on which the zeolite is being deposited (which loss possibly results in part from loss of rare earth from the zeolite). In addition the crystallinity of the finished catalyst is higher when the dissolved rare earth salt is present in the slurry, even when compared to a catalyst made in a similar manner except that the dissolved rare earth salt is omitted from the slurry and is instead applied to the rare earth zeolite matrix after the spray drying and the wet treatment to remove residual alkali metal.

The presence of the dissolved rare earth salt in the slurry results in a catalyst which attains the desired selective catalytic properties readily on mild thermal treatment without the need for any steam treatment such as is usually required for imparting the desired level of selectivity to catalysts. This elimination of the need for a steam treatment is of great commercial importance since it makes it possible to use the catalyst without building or operating any expensive steam treating facilities.

Although the use of a rare earth chloride as the dissolved salt in the slurry is preferred, in certain instances, e.g., as where the slurry contains particles of rare earth zeolite Y, there may instead be employed other sources of chloride ions such as, e.g., ammonium chloride.

At the time the particulate crystalline aluminosilicate zeolite, e.g., rare earth zeolite, is brought into contact with the matrix (containing Group IV–B metal oxide dispersed therein), the latter is preferably present as a freshly precipitated aqueous slurry. The concentration of the matrix in the slurry may be, for example, in the range of about 1 to 15%.

The crystalline zeolite is also preferably in slurry form. Its concentration in its slurry may, for example, be in the range of about 1 to 40%. Where a slurry of rare earth zolite is employed, a dissolved rare earth salt is advantageously present in an amount, expressed as rare earth chloride hexahydrate ($RECl_3 \cdot 6H_2O$), of from about 0.1 to 5 weight percent of the matrix, and preferably from about 0.333 to 1.0 weight percent of the matrix. (In the event that there is employed, instead of a rare earth salt, a source of chloride ions such as ammonium chloride, e.g., where the rare earth zeolite is a rare earth zeolite Y, the concentration of the ammonium chloride is desirably within the same range as that given above for the rare earth salt.)

Advantageously, the amount of crystalline aluminosilicate zeolite in the slurry is sufficient to provide a concentration of this component, in the finished catalyst, in the range of about 1 to 80 weight percent and preferably about 5 to 20%.

As previously noted, the particles of crystalline aluminosilicate zeolite are dispersed in the matrix, preferably by a thorough mixing of the slurry of rare earth zeolite with the slurry of matrix. Alternatively, the finely divided crystalline zeolite may be added to one of the forming solutions used in preparing the matrix, such as, e.g., to an aluminum sulfate solution or to a sodium aluminate solution. In such case, however, and where a rare earth zeolite is employed, the rare earth zeolite fines should have initially been subjected to pretempering and the residence time of such fines in such forming solution should not exceed about three hours so as to prevent any loss in crystallinity.

In the preferred process the initial slurries of crystalline zeolite and of matrix are thoroughly blended, as by pumps and paddles. It is then desirable to filter the blend. Filtration increases the total solids concentration of the blend to over 8%, e.g., typically from about 10 to 12%, and also removes dissolved salts.

The filtered material is then subdivided and dried to form the desired particles. A particularly good method of making microspherical particles (e.g., of particle size of about 1 to 200 microns, the bulk of which are in the range of about 40 to 90 microns) especially suitable for use in fluidized catalytic cracking, is spray drying, preferably under high pressures, e.g., of the order of from about 1000 to 2000 p.s.i.g.

The spray drying temperature is ordinarily within the range of 200° F. to 1000° F. The temperature used will depend upon such factors as the quantity of material to be dried and the quantity of air used in the drying. The evaporation rate will vary depending on the quantity of air used in the drying. The temperature of the particles which are being dried is preferably within the range of 150° F. to 300° F. at the completion of the drying.

The drying is preferably effected by a process in which the particles to be dried and a hot air stream are moving in the same direction for the entire drying period (concurrent drying), or where the hot air stream flows in the opposite direction (countercurrent drying), or by semi-counter current drying.

As previously mentioned, after the dried particles have been formed they are preferably given a wet treatment to further remove alkali metal. One suitable technique for this purpose is to treat the particles with a solution of ammonium sulfate, e.g., with water containing about 1–10%, preferably about 2–4%, of ammonium sulfate to remove sodium ions, and then to wash the particles with water. A series of alternating ammonium sulfate and water treatments may be used, ending with a wash with ammonia water (e.g. at a pH of 7–8.5) to remove sulfate ions. The particles are then dried in any suitable manner, as by flash drying.

By virtue of the foregoing wet treatment of the dried particles, e.g. with aqueous ammonium sulfate, to further remove alkali metal from the zeolite and matrix, ammonium ions are introduced. Upon subsequent drying, ammonia is liberated leaving hydrogen ions, so that the zeolite contains both desired metal cations, e.g., rare earth metal cations and hydrogen ions, thus resulting in a catalyst having highly desirable characteristics.

The finish catalyst is characterized by a residual sodium content not in excess of about 0.2 weight percent, expressed as $Na_2O$, based upon the weight of the dried catalyst. Indeed, a catalyst having a residual sodium content not in excess of about 0.1 weight percent $Na_2O$ may readily be attained. Where the dispersed crystalline zeolite is a rare earth zeolite of the X form (as contrasted to rare earth zeolite Y) a residual sodium level not in excess of about 0.05 weight percent $Na_2O$ may conveniently be achieved.

The catalysts of this invention can, by a relatively mild heat treatment, be put in a highly active condition in which they are suitable for direct use in fluid catalytic cracking and in which they exhibit the desired selectivity for producing gasolines, mainly at the expense of the undesirable products of cracking, e.g. dry gas and coke. This heat treatment can take place during regular cracking-regeneration cycles. Thus, when the catalysts are added, as makeup, in an operating fluid catalytic cracking installation they will soon attain their desired selectivity after a few cracking-regeneration cycles, without the need of a preliminary steam-activating step. Alternatively, the catalysts may be given a preliminary heat treatment in air (and in fluidized condition) at a temperature of 1100–1400° F. for from about 3 to 16 hours.

Catalysts prepared by the method of the present invention comprise Group IV–B metal oxide-containing silica-alumina matrix having dispersed therein crystalline alumino-silicate zeolite particles. These catalysts are characterized by markedly reduced coke formation when employed in the cracking of hydrocarbons. Additionally, these catalysts tend to exhibit a higher percent efficiency (defined as the ratio of volume percent gasoline to volume percent conversion, times 100) than similar catalysts which do not contain a Group IV–B metal oxide in the matrix phase.

The following examples will further illustrate our invention. Unless otherwise stated, all parts are by weight.

Example 1

An aqueous slurry of 5% of freshly precipitated alumina-silica matrix, having a pH of 5 and a temperature of 110° F., was prepared in accordance with the procedure set forth in U.S. Patent 2,941,961, using such proportions of aluminum salt as to provide 13% of alumina and 87% silica, in a matrix having a pore volume, when dried, of 0.90 cc./g.

To 100,000 grams of the foregoing slurry was added an aqueous solution containing 314 grams of zirconium sulfate $[Zr(SO_4)_2 \cdot 4H_2O]$ in 628 ml. water. The resultant slurry was thoroughly mixed and had a pH of 5.0.

To this freshly prepared slurry there was added a slurry made up of 433 grams of finely divided rare earth zeolite X (rare earth exchanged X-crystalline aluminosilicate) dispersed in an aqueous solution of mixed rare earth chlorides (750 ml. $H_2O$ and 130 grams of mixed rare earth chlorides as $RECl_3 \cdot 6H_2O$). The rare earth zeolite was a synthetic crystalline aluminosilicate zeolite X containing 24.5 weight percent rare earth (expressed as rare earth oxide) and 1.6 weight percent sodium. (Prior to forming the slurry of rare earth zeolite X, the rare earth zeolite X had been pretempered. This was effected by heating in a steam-air mixture at a temperature of 1200° F. for 13 minutes.) The blend of slurries, at a temperature of 110° F. and a pH of 5 was thoroughly mixed by paddles and then filtered to produce a filter cake. The cake was spray dried (inlet gas temperature about 1000° F.) to produce microspheres of from about 1 to 140 microns in diameter, with an average particle size of about 62 microns.

The spray dried particles were then treated with a 5% aqueous solution of ammonium sulfate at 90° F. for 2 minutes, then washed with water at 90° F. for 2 minutes. This cycle was repeated 2 times. The product was finally washed with ammonia water at a pH of 7.2 and a temperature of 90° F. for 2 minutes to remove sulfate ions, and then dried in an oven at 250° F.

The resulting composite catalyst was made up of a silica-alumina matrix (87 weight percent silica, 13 weight percent alumina) containing therein 2 percent by weight of zirconia, and having dispersed therein rare earth exchanged X-crystalline aluminosilicate in such amount as to equal 7.5 percent by weight of the overall composite. The composite contained about 0.02 percent by weight sodium (expressed as Na metal).

Examples 2 and 3

In order to simulate those conditions occurring when fresh fluid catalyst is added to catalyst at equilibrium in a fluid catalytic cracking system, wide cut mid-continent gas oil was cracked employing a weight hourly space velocity of 5, a catalyst to oil weight ratio of 5, at a temperature of 925° F. In Example 2 the catalyst was a mixture of (1) 49 grams (91.5% solids) of the fluid catalyst prepared as described in Example 1 and (2) 135 grams of a severely steamed silica-alumina catalyst (87 percent silica-13 percent alumina), having a surface area of 108 square meters per gram. For purposes of comparison, the catalyst employed in Example 3 was a mixture of, and in the same relative proportions, (1) a fresh fluid catalyst prepared in a manner similar to that described in Example 1 with the exception that the aqueous zirconium sulfate solution was not employed so that the matrix did not contain zirconia separately dispersed therein, and (2) severely steamed silica-alumina catalyst. The results are reported in Table 1.

TABLE 1

| | Example 2 | Example 3 |
|---|---|---|
| Conversion, percent vol | 64.2 | 63.6 |
| $C_5^+$ gasoline, percent vol | 42.4 | 38.9 |
| $C_4$'s gasoline, percent vol | 17.8 | 16.3 |
| Dry gas, percent wt | 9.1 | 9.4 |
| Coke, percent wt | 5.8 | 8.8 |
| Efficiency, percent | 66.0 | 61.2 |
| $\left(\dfrac{\text{gaso., percent vol.}}{\text{conv., percent vol.}} \times 100\right)$ | | |

It will be noted that the mixture employed in Example 2, wherein a zirconia promoted catalyst was employed, resulted in a coke production of only 5.8 percent by weight, as compared to a coke production of 8.8 percent by weight in Example 3. Thus, the catalyst of the present invention (Example 2) afforded a coke production of about one third less than the coke production for the "control" catalyst (Example 3). Additionally, the efficiency for Example 2 was 66.0% as compared to 61.2% for Example 3.

Examples 4–7

Two catalysts (Examples 4 and 5) were prepared as described in Example 1 to produce in each instance a composite wherein the matrix was silica-alumina (87% silica, 13% alumina) containing therein 2% by weight zirconia, the matrix having dispersed therein rare earth zeolite X in such amount as to equal 7.5% by weight of the composite.

Two additional catalysts (Examples 6 and 7) were prepared in a similar manner, but without incorporating the zirconia disperse phase. Thus, each such fluid catalyst was made up of an 87% silica-13% alumina matrix having dispersed therein rare earth zeolite X to a level of 7.5% by weight of the composite.

In Examples 4 and 6 the catalysts were subjected to mild steam treatment for 4 hours at 1400° F. and zero p.s.i.g. In Examples 5 and 7 the catalysts were subjected to a more severe treatment for 5 hours at 1400° F. and 15 p.s.i.g. The results are summarized in Table 2.

TABLE 2

| Example No. | 4 | 5 | 6 | 7 |
|---|---|---|---|---|
| Steam treat: | | | | |
| Temp., °F | 1,400 | 1,400 | 1,400 | 1,400 |
| Time, hrs | 4 | 5 | 4 | 5 |
| P.s.i.g | 0 | 15 | 0 | 15 |
| Surface area, m.²/g | 208 | 107 | 221 | 115 |
| FCC bench scale at 5 C/O, 5 WHSV, 925° F. with WCMCGO: | | | | |
| Conv., percent vol | 72.9 | 55.3 | 78.6 | 59.7 |
| $C_5^+$ gasoline, percent vol | 56.5 | 45.7 | 59.5 | 48.4 |
| $C_4$'s, percent vol | 16.1 | 10.8 | 18.9 | 12.2 |
| Dry gas, percent wt | 7.9 | 5.2 | 8.9 | 6.1 |
| Coke, percent wt | 4.2 | 1.9 | 4.6 | 2.5 |
| Eff. percent | 78 | 83 | 76 | 81 |
| $\left(\dfrac{\text{gaso., percent vol.}}{\text{conv., percent vol.}} \times 100\right)$ | | | | |

Despite the steam deactivation, the trend toward lower coke formation for catalysts of the present invention as compared to the "control" catalysts is readily apparent. Note also that at the milder steaming conditions the catalyst made by the method of the present invention gave an efficiency of 78 percent as compared to a 76 percent efficiency for the control. This trend was also apparent when more drastic steam treatments were employed, the catalysts of the present invention giving an efficiency of 83 percent as compared to 81 percent for the control.

Variations can of course be made without departing from the spirit and scope of our invention.

Having thus described our invention, what we desire to secure and claim by Letters Patent is:

1. In a method of preparing a composite fluid catalyst comprising forming a silica-alumina gel matrix by precipitating the alumina on silica gel, dispersing particulate crystalline aluminosilicate zeolite in said matrix to form a composite, and drying said composite in the form of small particles of a size suitable for use in fluid catalytic cracking, the improvement comprising admixing with said matrix, prior to the dispersing therein of said particulate crystalline aluminosilicate zeolite, a source of zirconium oxide from a zirconium salt in such amount that there is deposited in said matrix said zirconium oxide in an amount equal to at least 0.1 percent by weight of said matrix on a dry basis.

2. The method of claim 1 wherein the source of zirconium metal oxide is an aqueous salt solution of zirconium.

3. The method of claim 1 wherein the zirconium oxide is present in an amount of from about 0.1 to 10 percent by weight of said matrix.

4. The method of claim 1 wherein the zirconium oxide is present in an amount of from about 0.5 to 5 percent by weight of said matrix.

5. The method of claim 4 wherein the amount of particulate crystalline aluminosilicate zeolite present is from about 1 to 80 percent by weight of said composite.

6. The method of claim 1 wherein the crystalline aluminosilicate is a rare earth crystalline aluminosilicate zeolite.

7. The method of claim 6 wherein the rare earth zeolite is rare earth zeolite X.

8. The method of claim 6 wherein the rare earth zeolite is rare earth zeolite Y.

9. The method of claim 2 wherein said aqueous salt solution is added to said matrix at a pH of from about 4.0 to 6.0.

10. The method of claim 1 wherein the amount of silica in said matrix is from about 75 to 99 percent by weight and the amount of alumina in said matrix is from about 1 to 25 percent by weight.

11. A composite catalyst comprising a matrix formed by a precipitating alumina on silica, said matrix having incorporated therein from about 0.1 to 10 percent by weight of zirconium oxide and being characterized by a pore volume of about 0.5 to 1.2 cc./g. and an average pore diameter of from about 40 to 250 angstroms, said matrix having dispersed therein a crystalline aluminosilicate zeolite of a particle size of about 2 to 20 microns, the amount of said zeolite being from about 1 to 80 percent by weight of said composite, said zeolite having a sodium content of less than about 4 percent by weight.

12. The product of claim 11 wherein the crystalline aluminosilicate zeolite is rare earth zeolite Y.

13. The product of claim 11 wherein the crystalline aluminosilicate zeolite is rare earth zeolite X.

References Cited

UNITED STATES PATENTS

| | | | |
|---|---|---|---|
| 2,744,057 | 5/1956 | Emmett | 208—120 |
| 3,120,483 | 2/1964 | Hansford et al. | 252—454 X |
| 3,264,227 | 8/1966 | Cramer et al. | 208—120 X |
| 3,312,615 | 5/1967 | Cramer et al. | 252—455 |

DANIEL E. WYMAN, Primary Examiner

C. F. DEES, Assistant Examiner

U.S. Cl. X.R.

252—455; 208—120